United States Patent

Raynes

[15] 3,637,042
[45] Jan. 25, 1972

[54] METHOD AND APPARATUS FOR SUPPRESSING THE NOISE OF JET-PROPELLED AIRCRAFT

[72] Inventor: Burt F. Raynes, Chula Vista, Calif.

[73] Assignee: Rohr Corporation, Chula Vista, Calif.

[22] Filed: July 27, 1970

[21] Appl. No.: 58,387

[52] U.S. Cl................181/33 E, 181/33 HC, 181/33 HD, 239/265.33, 239/265.13
[51] Int. Cl................B64d 33/06, F01n 1/08, F01n 1/14
[58] Field of Search................181/43, 51, 33, 64.1, 33.221, 181/33.222, 33.05; 239/127.3, 265.11, 265.13, 265.17, 265.19, 265.23, 265.33

[56] References Cited

UNITED STATES PATENTS

| | | | |
|---|---|---|---|
| 2,487,588 | 11/1949 | Price | 239/265.23 |
| 2,839,891 | 6/1958 | Drakeley | 239/265.33 |
| 3,027,710 | 4/1962 | Maytner | 181/33.221 |
| 3,067,968 | 12/1962 | Heppenstall | 181/33.222 |
| 3,084,507 | 4/1963 | Kleinhans et al. | 181/33.222 |
| 3,174,282 | 3/1965 | Harrison | 181/33.221 |
| 3,516,511 | 6/1970 | Urquhart | 181/33.222 |

FOREIGN PATENTS OR APPLICATIONS

| | | | |
|---|---|---|---|
| 1,436,412 | 3/1966 | France | 181/33.221 |
| 602,859 | 6/1948 | Great Britain | 181/33.22 |
| 871,403 | 6/1961 | Great Britain | 239/265.33 |
| 1,019,857 | 2/1966 | Great Britain | 239/265.33 |

*Primary Examiner*—Robert S. Ward, Jr.
*Attorney*—George E. Pearson

[57] ABSTRACT

A first shield of substantially hemicylindrical form is mounted on an engine nacelle of a jet-propelled aircraft so that the longitudinal axis thereof is substantially parallel with the longitudinal axis of the nacelle. The first shield is movable axially of the nacelle between a retracted position wherein it is alongside the latter and a deployed position wherein it is disposed under the jet stream discharged from the engine in the nacelle. A second shield is mounted on the outer side of the first shield and conforms therewith, this second shield being movable axially of the first shield so that it can also be positioned under the jet stream. Means are provided for moving the shields between their retracted and deployed positions. Each shield is preferably provided with rotatable panels which extend longitudinally along the upper portion of the sides thereof.

10 Claims, 10 Drawing Figures

PATENTED JAN 25 1972
SHEET 1 OF 3
3,637,042
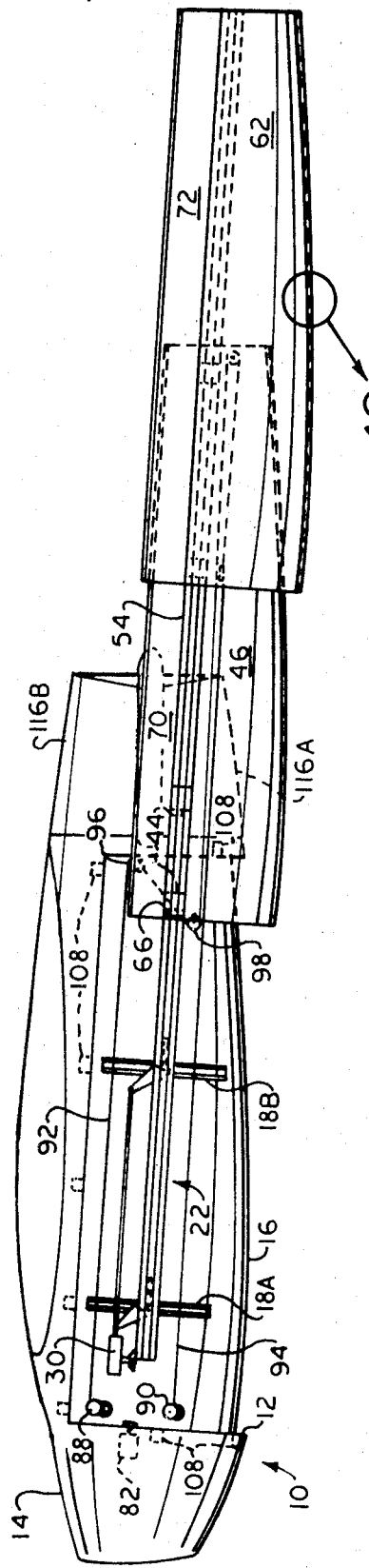
FIG. 2
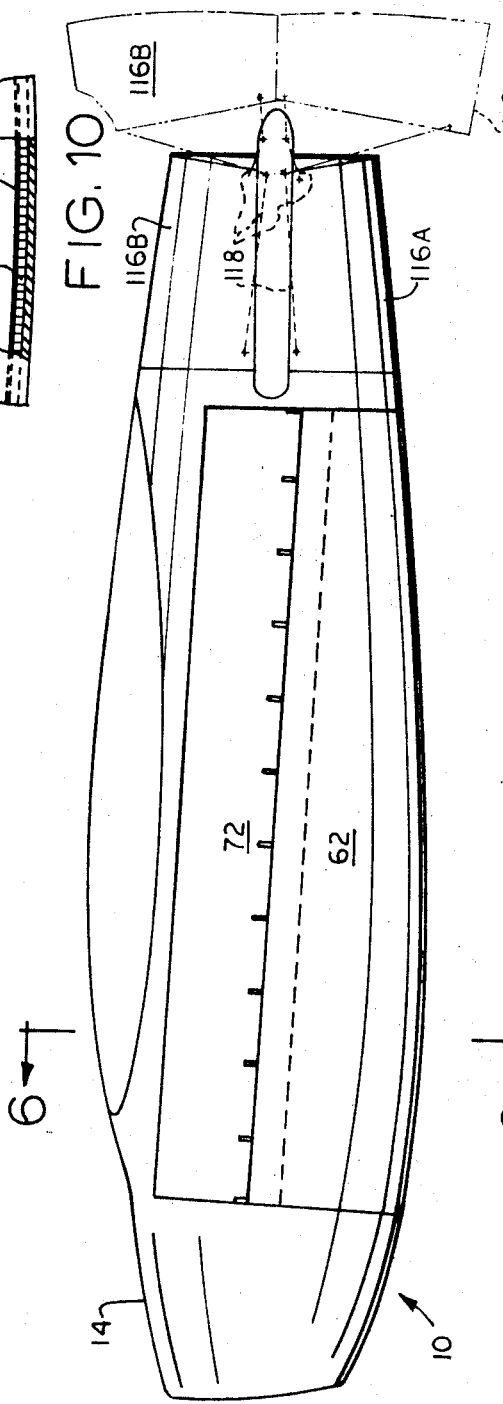
FIG. 10
FIG. 1
INVENTOR.
BY   BURT F. RAYNES
Edwin D. Grant
ATTORNEY

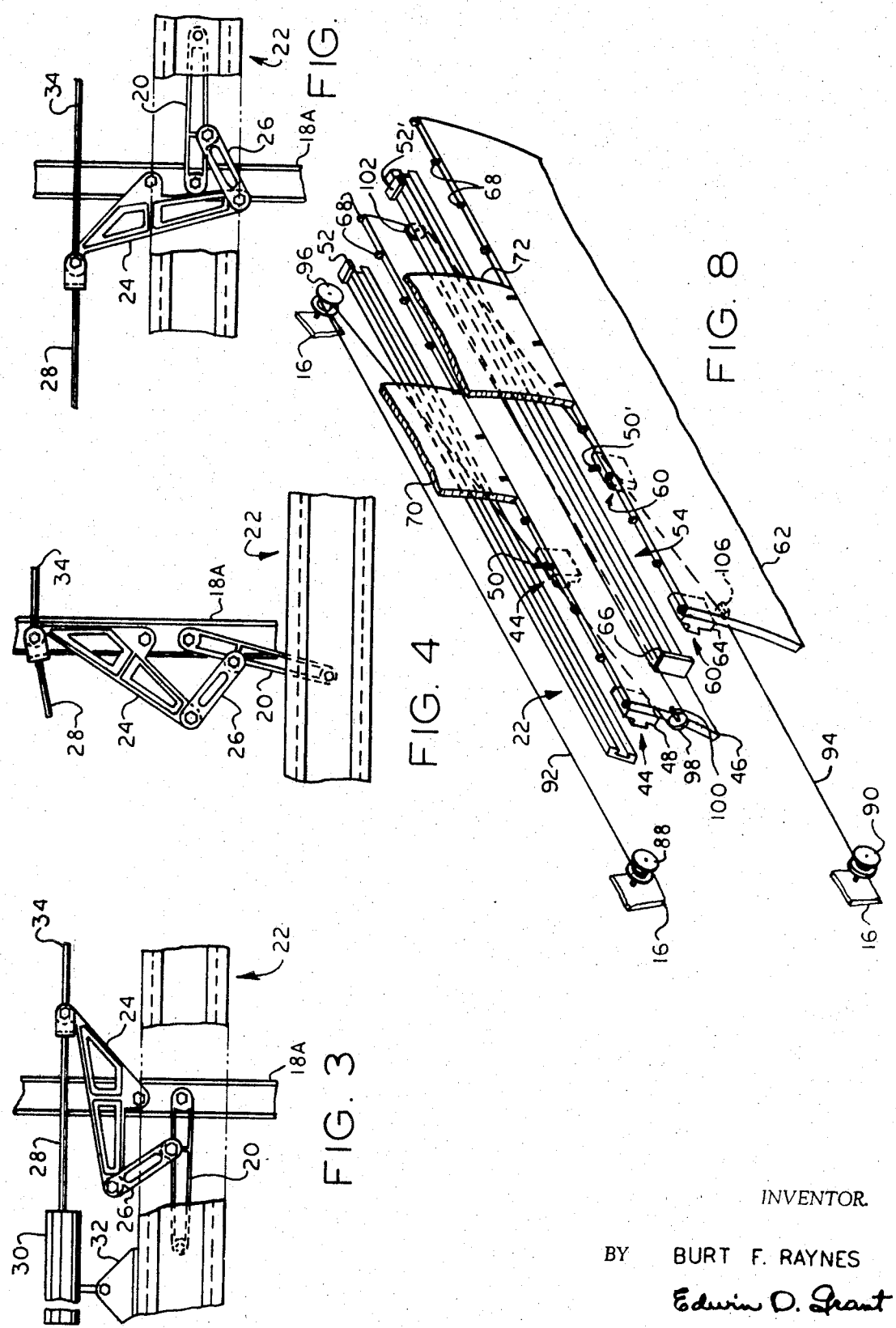

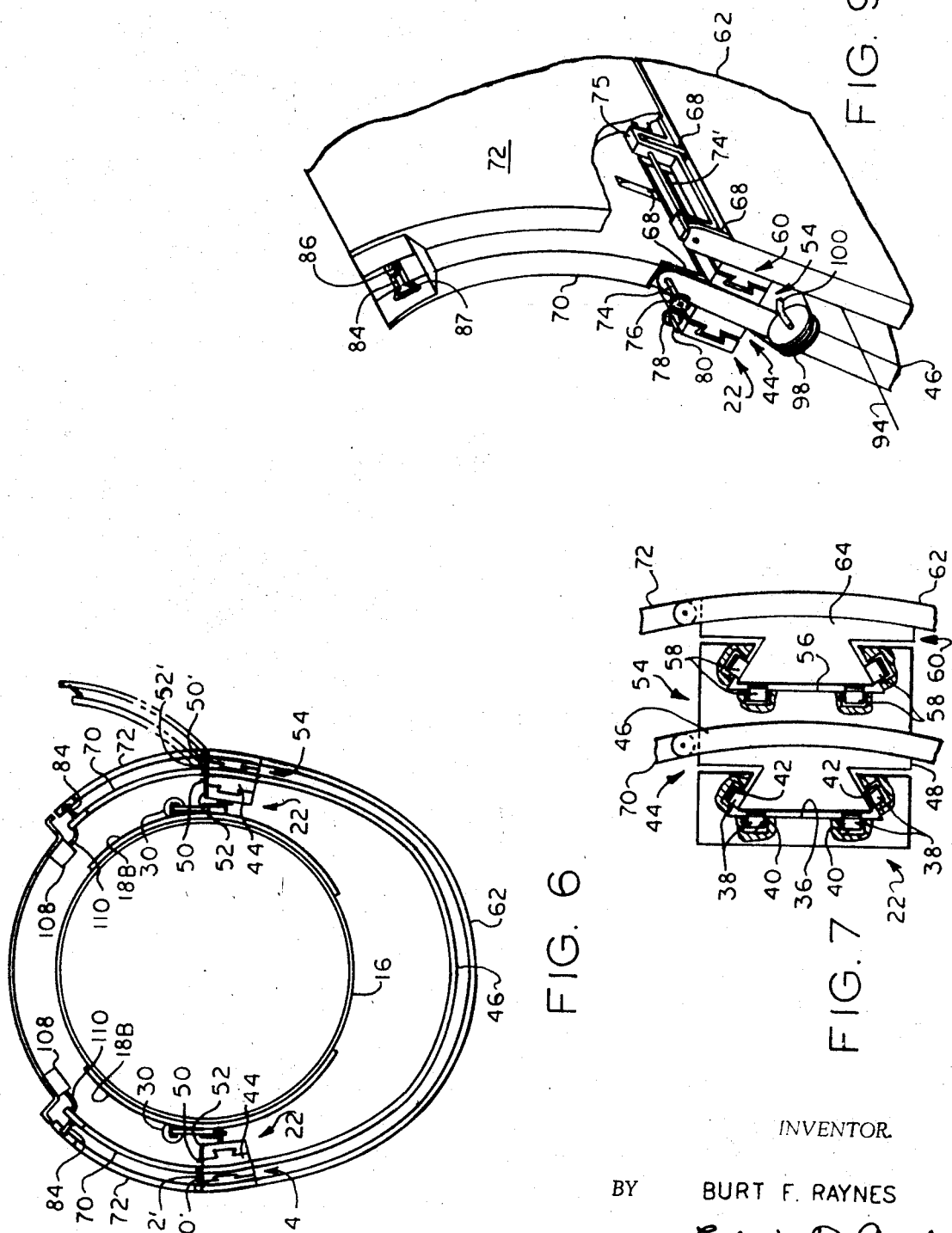

3,637,042

METHOD AND APPARATUS FOR SUPPRESSING THE NOISE OF JET-PROPELLED AIRCRAFT

SUMMARY OF THE INVENTION

This invention relates to jet propulsion and, more particularly, to a method and apparatus for effectively reducing the noise of operation of an aircraft jet engine.

It is known that much of the noise associated with the operation of an aircraft jet engine emanates from the jetstream discharged by the engine. The invention disclosed herein provides a method and apparatus for reflecting sound energy associated with such a jetstream, as well as engine noise which is emitted from the aft end of the fuselage or nacelle enclosing a jet engine, thereby substantially reducing the propagation of such sound energy in predetermined directions. A particular advantage of sound suppression apparatus in accordance with the invention is that its working components can be stowed in a streamlined configuration around an engine nacelle or the fuselage of an aircraft when the latter is in high altitude flight, at which time the noise of a jetstream is attenuated before reaching the earth's surface. Another advantage of apparatus in accordance with the invention is that it adds relatively little weight to an aircraft jet propulsion unit. Furthermore, such apparatus does not affect the operation of a jet engine and is economical to make and use.

In a preferred embodiment of the invention, the middle portion of the periphery of a jet engine nacelle (or the periphery of a fuselage enclosing a jet engine) is formed with a shallow recess that extends around the bottom of the nacelle and upwardly along its sides. A first pair of rails (hereinafter referred to as the first rails) are respectively mounted on the sidewalls of this recess and extend longitudinally of the nacelle in parallel relation with each other, the manner of attachment of the rails to the nacelle being such that the ends thereof can be simultaneously swung in a circular arc so as to thereby move the rails downwardly and then upwardly relative to the nacelle while shifting the same rearwardly thereon. Means are provided to effect the aforesaid movement of the first rails at a selected time. A pair of mounting blocks are slidably mounted on the outer side of each first rail for movement longitudinally thereof, and a first hemicylindrical sound shield is attached along its longitudinal edges to the outer sides of these mounting blocks. Hence the shield can be either positioned alongside the nacelle or moved rearwardly to a position wherein the greater portion thereof is disposed under the jetstream discharged from the engine enclosed within said nacelle.

A second pair of rails (hereinafter referred to as the second rails) are fixedly mounted on the outer side of the aforesaid first shield in coextensive, parallel relation with the longitudinal edges of the latter and adjacent to said edges. A pair of mounting blocks are also slidably mounted on the outer side of each second rail for movement longitudinally thereof, and a second hemicylindrical sound shield is attached along its longitudinal edges to the outer side of these mounting blocks. Hence the second shield can be either positioned alongside the first shield or moved rearwardly to a position wherein the greater portion thereof projects from the aft end of said first shield (and is disposed under the jetstream when the first shield is in a downstream position).

Panels are pivoted to the longitudinal edges of the first and second shields and extend lengthwise thereof, and means are provided to rotate these panels toward or away from the nacelle centerline. Means are also provided to simultaneously move the shields and panels attached thereto along their respective support rails and between the forward, stowed position wherein they extend around the nacelle and the aft, deployed position wherein the middle and aft portions thereof are under the jetstream. Lastly, means are provided to lock the shields and panels in their stowed position.

OBJECTS OF THE INVENTION

Accordingly, it is a primary object of this invention to provide means for effectively preventing the transmission to the earth's surface of sound energy associated with the jetstream of a jet-propelled aircraft.

Another object of the invention is to provide an effective method of reducing the noise of a jet-propelled aircraft without adversely affecting the operating efficiency of the engine or engines of such aircraft.

Still another object is to provide effective sound suppression apparatus for a jet-propelled aircraft without adding excessive weight thereto.

A further object is to provide sound suppression apparatus for a jet-propelled aircraft which is arranged so that working components thereof can be stowed in a streamlined configuration around the engine nacelles of the aircraft when the latter is in high altitude flight.

Another object is to reduce the transmission to the earth's surface of noise which is generated by a jet engine inside the nacelle or fuselage of an aircraft and which is emitted from the aft end of such engine housing.

DESCRIPTION OF THE DRAWINGS

FIG. 1 is a side elevation of an engine nacelle of an aircraft provided with sound suppression apparatus according to the present invention;

FIG. 2 is a side elevation of the same nacelle, illustrating components of the sound suppression apparatus in a deployed position;

FIGS. 3–5 are side elevations of certain components of the aforesaid apparatus, which are shown in different positions in the drawings;

FIG. 6 is a cross-sectional view taken along line 6—6 in FIG. 1;

FIG. 7 is a detail view illustrating the arrangement of certain components;

FIG. 8 is an exploded, pictorial view of sound shields and panels of the aforesaid apparatus, certain components being broken away in the drawing for clarity;

FIG. 9 is a detail view of certain components; and

FIG. 10 is an enlarged view illustrating one of the various types of sound-absorbing materials which may be bonded to the upper, or inside, surfaces of the aforesaid shields and panels in some embodiments of the invention, the view being taken at the section of FIG. 2 which is included within the circle designated by the number 10 and a portion of the wall of one of the shields being cut away so that the aforesaid sound-absorbing material can be seen.

Throughout the drawings and the following specification, the same numbers designate the same parts.

DETAILED DESCRIPTION

Components of a preferred embodiment of this invention are mounted on a jet engine nacelle of the type illustrated in FIGS. 1 and 2 and generally designated therein by the number 10. As can be seen in FIG. 2, the middle portion of nacelle 10 is formed with a shallow recess 12 that extends from outer wall 14 to an inner wall 16 and around the bottom of the nacelle and upwardly along its sides. A pair of curved channel bars 18A, 18B are fixedly attached to inner wall 16 on each side of nacelle 10 and extend vertically thereon in parallel relation to each other. Illustrated in FIGS. 3–5 are components which are mounted on each of the four channel bars 18, the drawings showing only one of the channel bars (namely, the forward channel bar 18A) for the sake of simplicity. A first lever arm 20 is pivoted at one end thereof to the middle portion of each bar 18, the other end of each first arm being pivoted to a respective one of two rails which are generally designated by the number 22 (see FIGS. 2 and 6) and which are disposed on opposite sides of nacelle 10. More particularly, first arms 20 are connected to the inner sides of rails 22 adjacent the ends thereof, and the axes of rotation of said first arms relative to channel bars 18 and the rails are perpendicular to the longitudinal axis of nacelle. Moreover, a second lever arm 24 is pivoted at the middle thereof to each channel bar 18, these second arms being spaced a short distance above the first arms 20. A link 26 is pivotally connected at one end thereof to each first arm 20 and at the other end thereof to one end of second arm 24, so that rotation of the latter rotates the first arm from a first position which is illustrated in FIG. 3 to a second position which is illustrated in FIG. 5. An intermediate position of first arm 20 is also illustrated in FIG. 4 to show more clearly the movement of rails 22, which are moved downwardly and then upwardly as they are moved rearwardly relative to nacelle 10. The other end of each second arm 20 of channel bar 18A is pivotally connected to the drive shaft 28 of a hydraulic cylinder 30 pivotally mounted on a bracket 32 projecting from inner wall 16 and fixedly connected thereto. The axes of rotation of the hydraulic cylinders are substantially coincident and perpendicular to the longitudinal axis of nacelle 10. One end of a connecting shaft 34 is pivoted to the same end of each second arm 24 to which drive shaft 28 is attached, and the other end of this shaft is pivoted to the corresponding end of the second arm mounted on the rearmost channel bar 18B. Thus the four second arms 20 can be simultaneously rotated by the synchronized actuation of the two hydraulic cylinders 30.

As illustrated in FIGS. 6 and 7, a dovetail slot 36 extends lengthwise of the outer side of each rail 22. A plurality of roller bearings 38 are arranged in sets which are spaced apart longitudinally of slots 36, one of said sets being shown in FIG. 7. More specifically, two bearings of each of said sets are respectively coaxially disposed within recesses 40 in the bottom wall of a slot 36 and the other two bearings of the set are respectively disposed within recesses 42 in the sidewalls of the slot, the axes of rotation of the latter bearings being parallel to said sidewalls respectively and lying in a plane normal to the longitudinal axis of the rail. A portion of each bearing 38 projects from the recess in which it is seated.

FIG. 8 most clearly illustrates mounting blocks which are generally designated by the number 44 and pairs of which are spaced apart along each longitudinal edge of a first hemicylindrical sound shield 46 and fixedly secured to the inner surface of the latter, one mounting block of each of said pairs being located at the forward edge of said first shield. Each of the four mounting blocks 44 is formed with a dovetail portion 48 which is disposed within slot 36 of a respective one of the rails 22 and the three surfaces of which abut rollers 38 therein. Thus the arrangement of rails 22, mounting blocks 44 and first shield 46 is such that the latter can be positioned alongside the rails, as illustrated in exploded view in FIG. 8, or moved rearwardly thereon to the position illustrated in FIG. 2. When the rearmost mounting blocks 44 reach the ends of rails 22 pins 50 which respectively project upwardly from the upper edges of said blocks contact stop members 52 which respectively project laterally from said rails, and thus further movement of first shield 46 in a rearward direction is prevented.

Fixedly mounted on the outer side of first shield 46 and respectively extending along the longitudinal edges thereof are two rails which are generally designated by the number 54 and the construction of which is identical to that of rails 22, each rail 54 having a dovetail slot 56 extending lengthwise of the outer side thereof and having roller bearings 58 disposed in sets along said slot (see FIG. 7). FIG. 8 most clearly illustrated mounting blocks which are generally designated by the number 60 and pairs of which are spaced apart along each longitudinal edge of a second hemicylindrical sound shield 62 and fixedly secured to the inner surface of the latter, one mounting block of each of said pairs being located at the forward edge of said second shield. As in the case of mounting blocks 44, each mounting block 60 is formed with a dovetail portion 64 which is disposed within slot 56 of a respective one of the rails 54 and the three sides of which abut rollers 58 therein. Thus second shield 62 can be positioned alongside first shield 46, as illustrated in exploded view in FIG. 8, or moved rearwardly on rails 54 to the position illustrated in FIG. 2. Fixedly fastened to the forward end of each rail 54 and projecting laterally therefrom is a plate 66. As will be seen hereinafter, second shield 62 contacts these plates when it is returned to nacelle 10 after having been deployed downstream thereof, and thus first shield 46 is also returned to a forward, or stowed, position.

A plurality of lugs 68 (see FIG. 8) are fixedly mounted in spaced relation along each longitudinal edge of first and second shields 46 and 62 and project upwardly therefrom. A first pair of panels 70 are respectively pivotally connected to the lugs 68 on the longitudinal edges of first shield 46, and a second pair of panels 72 are respectively pivotally connected to the lugs 68 on the longitudinal edges of second shield 62. More particularly, each panel 70, 72 is coextensive with the shield to which it is attached and is arcuate in cross-sectional form so as to conform with the shape of nacelle 10 when in a first position illustrated in FIG. 6, wherein the free end of each panel is a first distance from the longitudinal axis of said nacelle. However, when the described sound suppression apparatus is deployed panels 70 and 72 are rotated to a second position illustrated by phantom lines in FIG. 6, wherein the free end of each panel is a second greater distance from the longitudinal axis of the nacelle. Each panel 70 is pivoted to the lug 68 at the forward end of first shield 46 by means of a pivot pin 74 (see FIG. 9) which is fixedly connected to the forward edge of the panel and which extends through a hole in said lug and projects forwardly therefrom. Pivot pin 74 (and the corresponding pin 74' which connects panel 72 to shield 62) also extends through holes in the other lugs 74 and through holes in U-shaped members 75 the legs of which are fixedly connected to longitudinally extending segments of the edges of the panels and disposed on opposite sides of said lugs (except those at the end of the panel). A gear 76 is mounted on the free end of each pivot pin 74 and meshes with a gear 78 mounted on the drive shaft 80 of a respective one of two drive motors 82 (see FIG. 2, which illustrates one of these motors) which are attached to inner wall 16 of nacelle 10 on opposite sides thereof. Gears 76 disengage from gears 78 when first shield 46 is moved away from nacelle 10 to the deployed position thereof illustrated in FIG. 2. Hence pawls (not shown) are mounted on first shield 46 and motors 82 respectively and are actuated by suitable means such as solenoids so as to engage the teeth of gears 76 and 78 after panels 70 have been rotated to the second position thereof, thereby holding the gears in fixed position when they are disengaged from one another. When first shield 46 is returned to its forward position and gears 76 and 78 are again engaged with one another, the aforesaid pawls are moved away from the gear teeth so that panels 70 can be rotated to the first position thereof. Each panel 70 is connected to the adjacent panel 72 by means of a connector 84 one end of which is pivoted to a lug 86 fixedly mounted on the inner side of a respective one of the panels 72 and located at the forward edge thereof. The other end of each connector 84 is dovetail-shaped and slidably engaged within a dovetail slot 87 that extends lengthwise of the outer surface of each panel 70 adjacent the upper longitudinal edge thereof. Thus when panels 70 are rotated by motors 82 as described hereinbefore, panels 72 rotate therewith. However, the connection between the panels is such that panels 72 can move rearwardly with respect to panels 70 when second shield is deployed to the position thereof illustrated in FIG. 2.

A pair of drums 88, 90 are mounted on inner wall 16 of nacelle 10 on each side of the latter and are rotatable about axes substantially perpendicular to the longitudinal axis of said nacelle. Each drum can be turned in opposite directions by drive means (which are conventional and thus are not shown) connected to inner wall 16 and has one end of a cable 92, 94 wound thereon. Cable 92 extends from drum 88 to a pulley 96 rotatably mounted on a support arm 100 in turn fixedly secured to the outer surface of first shield 46 adjacent the forward edge thereof, thence to a pulley 102 rotatably mounted on the outer surface of said first shield adjacent the aft edge thereof, and finally to a lug 106 mounted on the inner surface of second shield 62 adjacent the forward edge thereof, the cable being fixedly secured to said lug. Pulley 98 is canted relative to the adjacent edge of first shield 46 as illustrated. Cable 94 extends from drum 90 to lug 106 and is also fixedly secured thereto.

Outlined by broken lines in FIG. 2 are a plurality of actuators 108 which are mounted on the inner side of outer wall 14 of nacelle 10 and which can be operated to engage and disengage locking members 110 connected thereto with the adjacent edges of second shield 62 and panels 72 respectively when the latter are in a stowed position within the recess 12 in said nacelle.

OPERATION

When the above-described sound suppression apparatus is not in use rails 36 and 66 are in a first forward position alongside rails 22 and sound shields 46 and 62 and panels 70 and 72 are positioned within the recess 12 in nacelle 10 as illustrated in FIG. 1. In this position the outer surfaces of second shield 58 and the panels are even with adjacent surfaces of outer wall 14 of nacelle 10. When the shields and panels are to be deployed to suppress the noise of a jet engine enclosed within nacelle 10, actuators 108 are operated to disengage the locking members connected thereto from second shield 62 and panels 70 and motors 82 are then operated to swing panels 70 and 72 to the position illustrated by broken lines in FIG. 6. Hydraulic cylinders 30 are then actuated to move the drive shafts 28 thereof toward the forward end of the nacelle, which movement of the drive shafts rotates first arms 20 from the position illustrated in FIG. 3 to the position illustrated in FIG. 5. As mentioned hereinbefore, this rotation of first arms 20 moves rails 22 downwardly and then upwardly relative to nacelle 10 while they are simultaneously moved toward the aft end of the latter. Hence shields 46 and 62 are placed in a position which permits them to be moved rearwardly along rails 22 and 50 respectively without shield 46 contacting the outer wall 14 of the nacelle. As the shields are moved by the rotation of first arms 20, drums 88 and 90 are rotated so as to unwind cables 92 and 94 therefrom, the angular velocity of the drums being at a predetermined rate so that the cables do not become slack. After rails 22 have reached their deployed position drums 88 are rotated to wind cables 92 thereon while drums 90 are rotated to unwind cables 94 therefrom. The arrangement of the described components is such that when cables 92 are wound on drums 88 both shields 46 and 62 are simultaneously pulled rearwardly on their support rails 22 and 54 respectively. Movement of shield 46 in this direction is stopped, however, when pins 50 on the rearmost mounting blocks 44 contact stop members 52 on rails 22. The continued rotation of drums 88 to wind cables 92 thereon thereafter pulls second shield 62 rearwardly until the rearmost mounting blocks 60 reach the ends of rails 54, at which time the rotation of drums 88 (and of drums 90) is stopped. Preferably stop means such as pins 50' and stop members 52' are also mounted on the rearmost mounting blocks 60 and rails 54 respectively to ensure that the former are retained on the latter.

When in a deployed position shields 46 and 62 intercept sound energy which is associated with the jetstream issuing from nacelle 10 and which is traveling downwardly and laterally therefrom, and this sound energy is consequently reflected upward. The shields also intercept and reflect upwardly sound energy which is generated within nacelle 10 and emitted from the aft end thereof, which noise is to be considered, for the purpose of interpretation of claims appended hereto, as sound energy associated with the jetstream issuing from the nacelle. It should be noted that panels 70 and 72 serve to widen the area of interception of sound energy since they extend laterally from the longitudinal edges of shields 46 and 62 respectively when deployed as illustrated by phantom lines in Fig. 6.

When a jet-propelled aircraft is at the altitude where cruising flight is conducted, the sound energy of its jetstream, or streams, is of course attenuated before reaching ground level. Hence shields 46 and 62 can then be returned to a stowed position within recess 12 of nacelle 10. This retraction of the shields can readily be effected by rotating drums 90 to wind cables 94 thereon, which pulls second shield 62 toward the forward end of recess 12 in nacelle 10. Drum 88 is simultaneously rotated at a predetermined angular velocity to unwind cables 92 therefrom without permitting it to become slack. When the forward edge of the second shield contacts plates 66 on the forward ends of rails 54, first shield 46 is also pulled toward the forward end of recess 12. After the shields have been positioned alongside rails 22 hydraulic cylinders 30 are actuated to move the drive shafts 28 thereof toward the aft end of nacelle 10, which movement of the drive shafts 28 returns first arms 20 to the position thereof illustrated in FIG. 3. Motors 82 are then operated to rotate panels 70 and 72 toward inner wall 16 of the nacelle. Hence the sound shields and panels can be placed in a streamlined configuration around the nacelle during cruise flight of the aircraft, but the same are arranged so that in effect they form an elongate, extensible shield which can be extended rearwardly from nacelle 10 to a position spaced a predetermined distance below the longitudinal axis of the jetstream issuing from said housing (for the purpose of interpretation of claims appended hereto, the term "elongate, extensible shield" is thus to be interpreted as referring to the arrangement of at least two hemicylindrical shields which can be disposed in tandem relation downstream from a housing enclosing a jet engine, as disclosed). The locking members associated with actuators 108 are of course engaged with shield 62 and panels 70 and 72 respectively when the latter are in their stowed position. Sound shields 46 and 62 and panels 70 and 72 are preferably formed of a suitable lightweight metal. As illustrated in FIG. 10, a sound-absorbing material, such as a honeycomb core material 112 covered with a perforate face sheet 114, can be bonded to the upwardly facing surfaces of the shields and panels if desired. Conventional thrust reversing doors 116A, 116B are mounted at the aft portion of nacelle 10 and can be moved between a first position (illustrated by solid lines in FIG. 1) wherein the doors form a smooth continuation of the wall of the nacelle, and a second position (illustrated by broken lines in the same drawing) wherein the doors abut each other downstream from the nacelle and deflect the jetstream issuing therefrom in the forward direction to thereby reverse the thrust of the propulsion assembly, the doors being pivotally connected to the nacelle by means of conventional four bar links 118.

Tests have shown that when shields 46 and 62 are deployed there is reduction in the perceived noise level at points which are disposed both under said shields and at the sides thereof. More particularly, a test has been conducted with a single hemicylindrical shield extended behind the aft end of a thrust nozzle for a distance equal to three times the exit diameter of the nozzle. The perceived noise level was measured by use of a microphone placed on a line which extended laterally from a side of the shield, both with the shield disposed between the microphone and the jetstream issuing from the thrust nozzle and with the shield removed. When the shield was in position to block sound energy of a jetstream discharged from a turbofan jet engine operating under takeoff conditions, the perceived noise level at a point 200 feet from the side of the shield was 3.4 decibels less than the perceived noise level at the same point with the shield removed. Under the same test conditions but with a hemicylindrical shield extended behind the aft end of the thrust nozzle for a distance equal to six times the exit diameter of the nozzle, the perceived noise level at a point 200 feet from the shield and located on a side line was 6.2 decibels less with the shield in place than the perceived noise level with the shield removed.

Although the invention has been described with reference to a particular embodiment of the same, it should not be considered to be limited thereto for various modifications could be made therein by one having ordinary skill in the art without departing from the spirit and scope of the invention as defined in the following claims. For example, although in the embodiment of the invention which has been described and illustrated the shields 46 and 62 are mounted on an engine nacelle 10 of a jet-propelled aircraft, the shields can also be mounted on the fuselage of such an aircraft, the only requirement being that the shields be mounted so that they can be deployed to a position wherein they intercept the sound energy associated with the jetstream issuing from a jet engine of the aircraft.

What is claimed as new and useful and desired to be secured by United States Letters Patent is:

1. A method of suppressing the noise of a jetstream issuing from a jet engine of an aircraft, which comprises positioning a plurality of elongate shields of hemicylindrical form at successively greater distances downstream of said engine thereby to provide an extensible shield of relative great length, size and surface area, and disposing said shield in predetermined spaced relation with respect to the longitudinal axis of said jetstream to intercept sound energy associated with said jetstream and change the direction of travel thereof.

2. The method of claim 1 including absorbing a portion of said noise at said shields, thereby to minimize transfer of noise therethrough.

3. In combination with an aircraft having a jet engine enclosed in a housing, sound suppressing apparatus comprising a plurality of elongate sound shields each of hemicylindrical form, means for positioning said shields at successively greater distances downstream of said engine thereby to provide an extensible shield of relatively great length, means mounting said extensible shield on said aircraft for movement between a first position wherein said extensible sound shield is disposed alongside said housing and a second position wherein said extensible sound shield is disposed between the jetstream discharged from said engine within said housing and the earth's surface, and means on said aircraft for returning said extensible sound shield to said first position after it has been moved to said second position thereof.

4. The combination defined in claim 3 including thrust-reversing doors mounted on the aft portion of said housing for movement between a first position wherein said doors form a smooth continuation of the wall of said housing, and a second position wherein said doors abut each other downstream from said housing and deflect said jetstream in a forward direction to thereby reverse the thrust thereof.

5. Apparatus as defined in claim 3 including means on said aircraft for moving said extensible sound shield from said first position to said second position thereof.

6. Apparatus as defined in claim 1 including sound-absorbing material on the surface of said sound shield adjacent said jetstream.

7. Apparatus as defined in claim 3 wherein said engine is enclosed in a nacelle and said extensible shield conforms with the shape of the latter and becomes a part thereof when in said first position thereof.

8. Apparatus as defined in claim 7 wherein said extensible sound shield is slidably mounted on at least two parallel rails which are respectively attached to opposite sides of said nacelle and extend longitudinally thereof.

9. Apparatus as defined in claim 8 wherein a shallow recess is formed in the periphery of said nacelle to receive said extensible shield when the latter is stowed, and including means operatively associated with said nacelle and rails for moving the latter in an arcuate motion so as to move said extensible shield out of and into said recess when said shield is being deployed and retracted.

10. In combination with an aircraft having a jet engine enclosed in a housing, sound suppressing apparatus comprising an elongate, extensible sound shield mounted on said aircraft for movement between a first position wherein said sound shield is disposed alongside said housing and a second position wherein said sound shield is disposed between the jetstream discharged from said engine within said housing and the earth's surface, means on said aircraft for returning said sound shield to said first position after it has been moved to said second position thereof, a pair of auxiliary panels respectively pivoted at one longitudinal edge thereof to longitudinally extending edges of said sound shield and rotatable between a first position wherein the free ends thereof are a first distance from the longitudinal axis of said engine and a second position wherein the free ends thereof are a second greater distance from said axis, and means on said aircraft for rotating said auxiliary panels between said first and second positions thereof.

* * * * *